MECHANICAL SOUND SYSTEM FOR PHONOGRAPH RECORD PLAYER

Filed April 5, 1967

INVENTOR.
John F. Castagna
BY
Philip S. Hilbert
ATTORNEY

United States Patent Office 3,450,410

Patented June 17, 1969

3,450,410

MECHANICAL SOUND SYSTEM FOR PHONOGRAPH RECORD PLAYER

John F. Castagna, 2135 E. 8th St., Brooklyn, N.Y. 11223

Filed Apr. 5, 1967, Ser. No. 628,647
Int. Cl. G11b 3/02
U.S. Cl. 274—24 5 Claims

ABSTRACT OF THE DISCLOSURE

A phonograph record reproducing apparatus having an audio signal transmitting mechanical linkage directly connecting a needle with a fixedly positioned sound reproducing cone, the linkage including successive signal transmitting articulated joints for translating the pickup movements of the needle to the reproducing cone and correlating selected spatial relationships between the needle and the reproducing cone; and signal transmitting articulated joints of high compliancy providing for movement of the needle relative to the record as the same is lifted and lowered in respect to the record groove and moves laterally between the inner and outer edges of the record during the playing of the record and its return to its rest position.

*Background of the invention*

The invention pertains to a phonograph reproducing apparatus having a stiff elongated audio signal transmitting linkage with a phonograph needle mounted at one end thereof, the other end thereof being directly connected to a fixedly positioned sound reproducing cone.

In conventional phonographs of the acoustical type, a swivelled tone arm carries at the outer end thereof a needle-diaphragm assembly, wherein essentially the needle is mounted on a pivoted lever whose free arm is connected to the diaphragm. The diaphragm vibrates in response to the modulation of the needle as it moves in the record groove and an audible air wave is pumped into the hollow tone arm and passes to a horn or enlarged extension of the arm. The tone arm is rotatably mounted at the rear thereof for lateral movement in following the record groove. Vertical movements such as lifting and lowering the needle as well as accommodation for record warpage, is provided by swivelly mounting the needle-diaphragm assembly on the forward end of the tone arm.

The construction of needle-diaphragm assembly of such known phonographs requires a substantial tracking force to achieve adequate volume and sound quality. In addition, the assembly has poor vertical and lateral compliance which makes it difficult to maintain the needle in the record groove when there is high modulation, particularly at low frequencies. Further, the large tracking force and poor compliance gives rise to accelerated wear of the records, particularly with long-playing records which have microgrooves.

An object of this invention is to provide an improved phonograph having a swivelled and pivoted arm, a mechanical audio signal transmitting linkage directly interconnecting the phonograph needle with a sound reproducing cone which is in a fixed position, the linkage being mounted in the arm in a manner similar to that found in electronic cartridge type phonographs; the linkage being suitably articulated with a high degree of compliancy to allow the arm to move freely vertically and laterally in respect to a record, while maintaining a high quality of transmission of audio signals through the linkage and its articulated portions.

A further object of this invention is to provide in a phonograph of the character described, a mechanical linkage capable of translating the lateral modulation of the needle in the record grooves, to the required movement of the sound reproducing cone in accordance with the fixed position thereof.

Another object of this invention is to provide a phonograph having a mechanical linkage of the character described wherein the linkage is adapted to transmit audio signals with a mechanical advantage or disadvantage in accordance with the desired volume of the reproduced sound and the desired compliance of the needle.

Still another object of this invention is to provide an improved phonograph construction including an elongated stiff audio signal transmitting element directly interconnecting a needle and a fixedly positioned sound reproducing cone, the element including successive articulated portions of high compliancy so as to provide for necessary movements of the needle in all directions; such compliancy being of an order as to minimize the force necessary to maintain the needle in the record groove and thereby markedly reducing wear of the the record grooves, yet having transmission properties which provide reproduced audio signals of excellent volume and tonal quality.

Still a further object of this invention is to provide a phonograph of the character described, having a minimum number of components and a simplicity of construction which allows for compactness and minimal weight, with substantial reductions in part and assembly costs; the device lending itself to incorporation in toys, including talking dolls and the like, which require a sound reproducing means; the reproduced sounds thereof having good volume and tonal quality approaching that derived from electronic cartridge-amplifier type phonographs.

Other objects of this invention will in part be obvious and in part hereinafter pointed out.

*Summary of the invention*

The invention relates to a phonograph having a fixedly positioned sound reproducing cone, and an audio signal transmitting member directly connecting a phonograph needle to the cone, the member having highly compliant, articulated, audio signal transmitting portions connecting successive sections of the member, so as to provide for all necessary movements of the needle including the modulation thereof in the record groove and the movement thereof as the same is lowered or lifted from the record and the movement necessary to traverse the spiral groove of the record in the reproduction of audio signals therefrom and restoration to its normal rest position.

*Description of the preferred embodiment*

Figure 1:
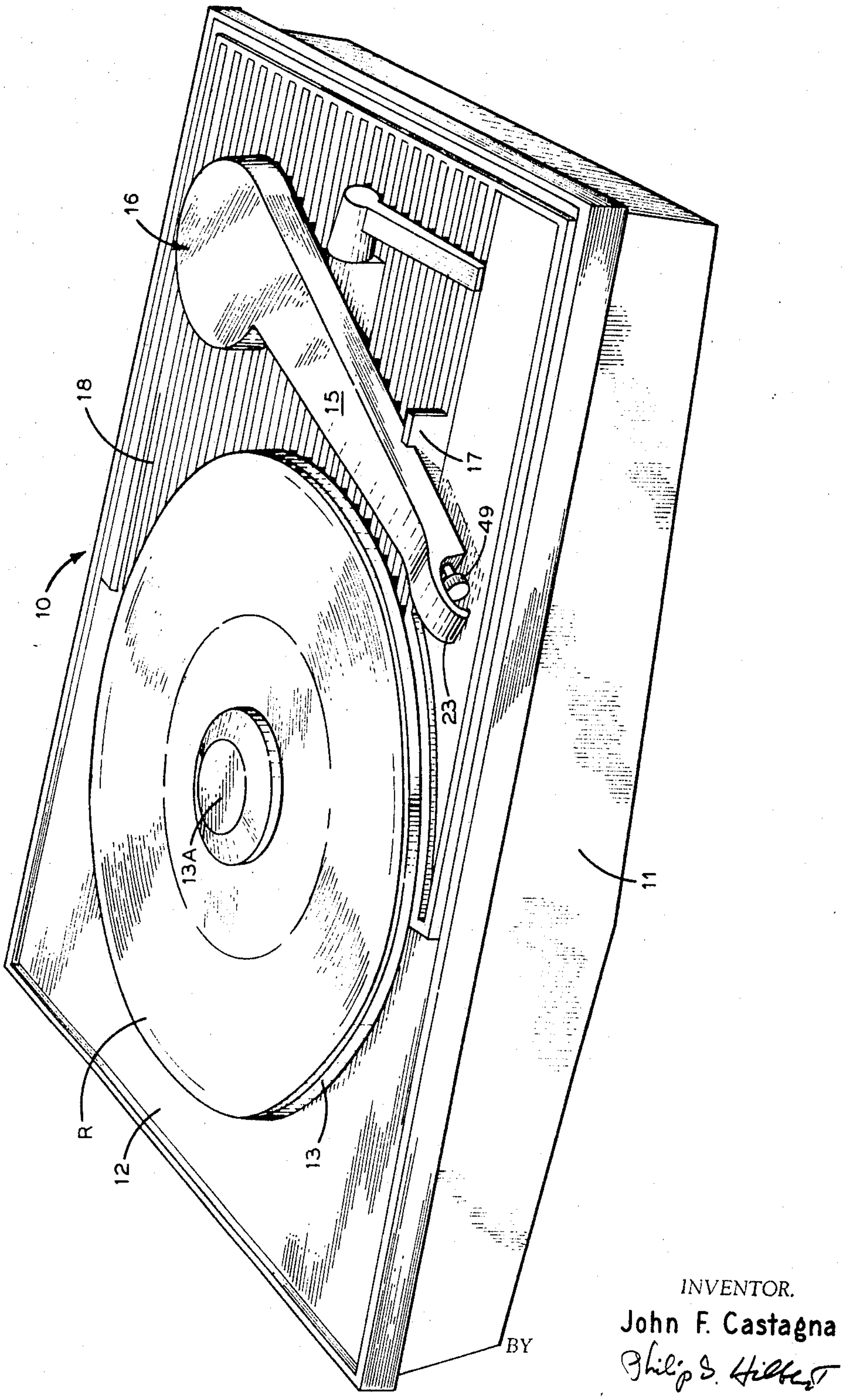
FIG. 1 is a perspective view showing a phonograph embodying the invention.

As shown in the drawings, and particularly FIG. 1, 10 designates a phonograph embodying the invention. The same comprises a housing 11 formed of molded plastic or other suitable material, which for the purpose of illustration, is shown as being of rectangular shape, and including a top wall or deck 12. A record turntable 13 and associated record spindle 13A is positioned on deck 12, in a conventional manner; the same being rotated by suitable motor means, not shown, located within housing 11. Such motor means may take the form of an electric motor which may be operated from the usual electric power outlets, or may be battery operated, in which batteries, not shown, are carried in housing 11. Alternative forms of motor means may be used, including spring motors, or the like.

Turntable 13 is adapated to carry records R, which preferably have grooves of the laterally modulated type. A conventional phonograph needle N which engages the groove of a record R as the same is rotated on turntable 13, is directly connected to a sound reproducing cone generally indicated at C, which is fixedly mounted on the underside of deck 12, by a novel mechanical, audio signal transmitting linkage, generally indicated at L.

The linkage L includes a horizontally disposed section H which is housed in a tone arm 15 of inverted U shaped cross section, formed of molded plastic or other suitable material; which is movably mounted at the rear end thereof on deck 12, as at 16. The arm 15 is supported in its inoperative, rest position, at a forward position thereof, by an upstanding notched member 17 fixed to deck 12. The deck 12 is perforated in grille form adjacent turntable 13, as at 18, for transmission of reproduced sounds derived from sound reproducing cone C and hereinafter described in detail.

The arm 15 comprises a top wall 19, depending side walls 20; a forwardly disposed end wall 21 formed with a downwardly opening notch 22 therein, for the purpose later appearing; and a tab portion 23 extending forwardly of end wall 21, providing means for lifting arm 15. The rear portion of arm 15 is of enlarged lateral extent, comprising a substantially circular top wall portion 24, opposed curved side wall portions 25, 26 depending from peripheral edge portions of top wall 24, said side wall portions 25, 26 merging at their forward ends with the rear ends of side walls 20.

The opposed side wall portions 25, 26 are formed with laterally aligned pivot openings 27 for the purpose later appearing. A pocket structure 28 is provided on the underside of top wall portion 24, the same being located adjacent side wall portion 25, for the purpose later appearing.

The linkage L further includes a vertically disposed section V which is in articulated relation at the upper end thereof, to the rear portion of horizontal linkage section H, as hereinafter described in detail; the lower end of linkage section V being connected to sound reproducing cone C. Cone C is of a conventional construction and of a selected diameter which may be proportioned to the dimensions of housing 11. Cone C is fixed to the underside of deck 12, the peripheral outer portion 31, thereof being cemented or otherwise secured to a circular rib 32 depending from and integral with deck 12. A bushing 33 is fixed to the apex portion 34 of cone C, as by cementing or the like, for receiving therein the lower end of linkage section V, as hereinafter described.

Figure 2:
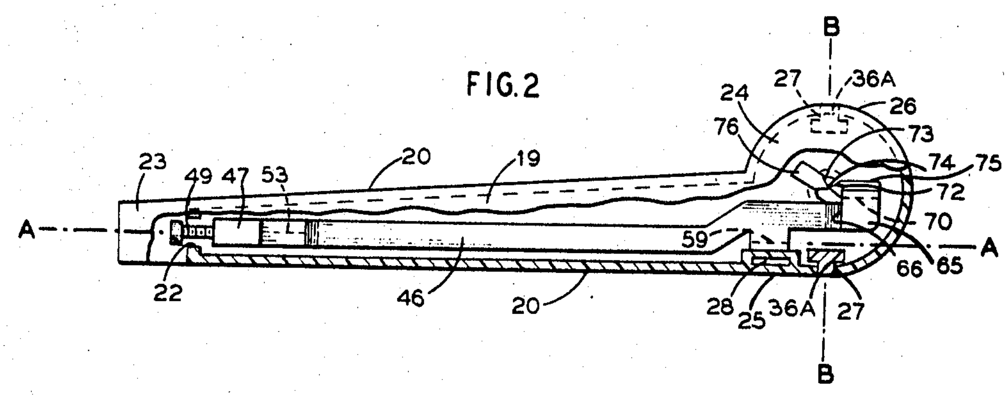
FIG. 2 is a top plan view, with parts cut away, showing the tone arm and the audio signal transmitting linkage mounted thereon.
Figures 3, 4:
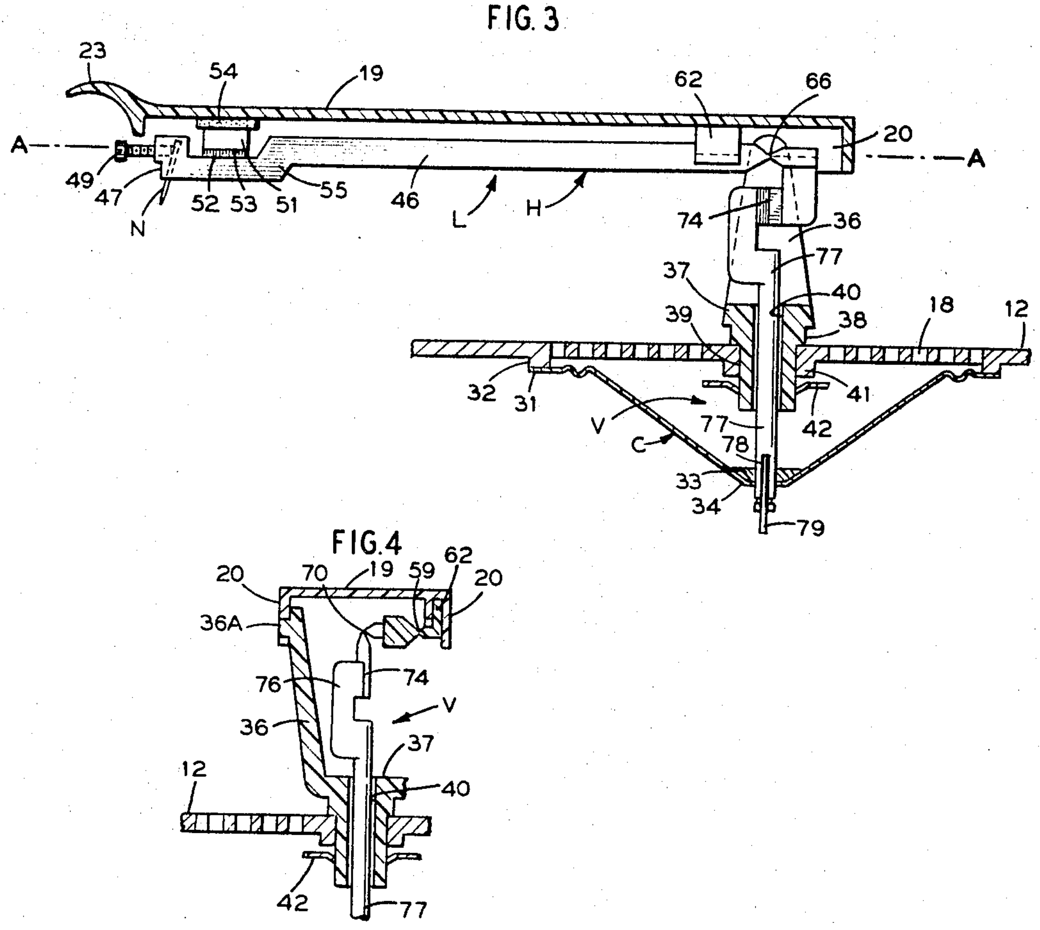
FIG. 3 is a side elevational view thereof, with parts in section.
FIG. 4 is an end elevational view thereof, in section.
Figure 5:
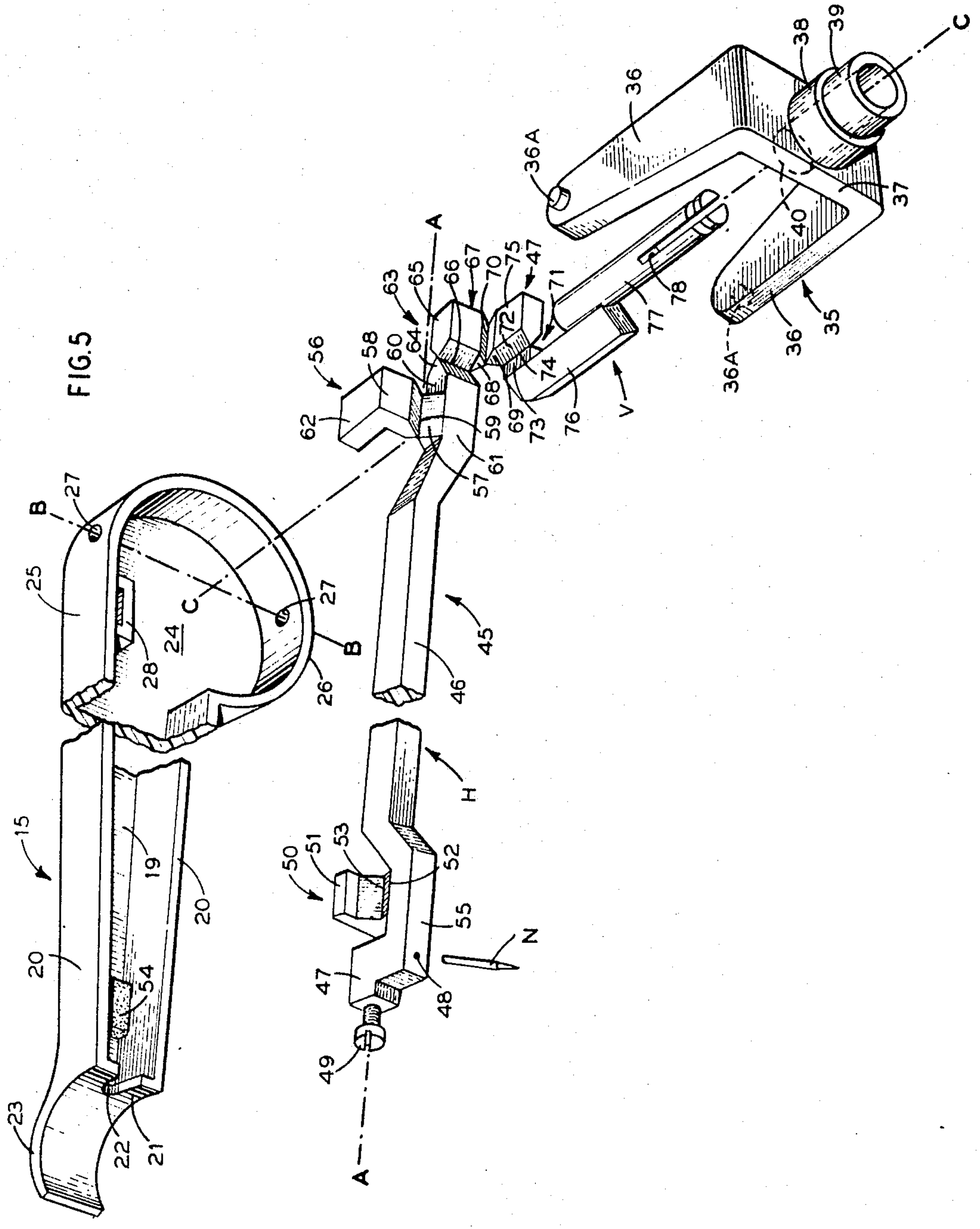
FIG. 5 is an enlarged, exploded view showing the details of the articulated portions of the audio signal transmitting linkage.

Tone arm 15 has lateral as well as vertical movements, allowing needle N carried thereby, to move across record R as the same is being played, and to allow for raising and lowering needle N relative to the record groove. To this end, there is provided a yoke member 35 having laterally related arms 36 interconnected by a bight portion 37. A bushing 38 having a portion 39 of reduced outer diameter extends from the underside of bight portion 37 and communicates with an opening 40 therein to provide a through passage for passing a lower portion of linkage section V therethrough Yoke member 35 is swivelly mounted on deck 12 at point 16 by way of an integral bearing portion 41 formed in said deck 12; the bushing 38 thereof being seated on top surface portions of deck 12, while portion 39 thereof passes through bearing portion 41. An annular clip 42 located on bushing portion 39, retains yoke member 35 against undue upward movement relative to deck 12. As shown in FIGS. 2, 4, outwardly projecting ears 36A on the upper ends of yoke arms 36 are receivable in pivot openings 27 of tone arm 15, upon slightly compressing yoke arms 36 toward each other, and then releasing the same.

The audio signal transmitting linkage L which directly connects phonograph needle N with cone C, takes the form of a one piece member which may be molded of polypropylene resin. The member may have a square or rectangular section to impart a degree of stiffness thereto, yet being provided with a series of articulation or hinge portions which are integral with the interconnected sections and capable of transmitting audio signals with excellent volume and tonal qualities.

Thus, linkage portion H which is housed in tone arm 15 and mounted thereon, comprises a main body portion 46 with a needle mounting portion 47 extending forwardly thereof. Portion 47 is formed with a recess 48 extending upwardly from the bottom surface thereof, for receiving therein the shank of needle N. A set screw 49 threaded into the forward face of portion 47 acts to retain needle N in place. Screw 49 projects through slot 22 in end wall 21 of arm 15, for ready access and adjustment thereof.

Since needle N is modulated from side to side as it travels in the groove of record R, which groove is modulated on the side portions thereof, in the usual manner; body portion 46 is suitably mounted on the underside of top wall 19 of arm 15. To this end, body portion 46 is provided with integral hinge means 50 formed of vertically related sections 51, 52 of V shaped cross section with their apices coincident to form a horizontally disposed hinge line 53. The upper hinge section 51 is cemented to a resilient pad 54 of sponge rubber or the like, which in turn is cemented to the underside of tone arm top wall 19. Lower hinge section 52 is integral with the top surface of a short linkage portion 55 inerconnecting portions 46, 47 and in downwardly offset relation to said sections to accommodate hinge means 50. However, hinge line 53 coincides with the longitudinal axis of body portion 46, indicated at A—A.

Linkage section H is further hingedly connected at a rear portion thereof, to arm 15. To this end, second hinge means 56 is provided, the same comprising laterally related section 57, 58 of V shaped cross section with their apices coincident to form a horizontally disposed hinge line 59. Hinge section 57 is integral with a side surface portion 60 of a laterally offset portion 61 extending rearwardly from body portion 46, thereby locating hinge line 59 in longitudinal alignment with hinge line 53 and coincident with axis A—A. Hinge section 58 includes an upwardly extending arm portion 62 which is received in pocket 28 of arm 15 and is cemented therein.

As arm 15 has pivoted movement relative to yoke member 35, by way of ears 36A, on a transverse axis indicated at B—B; similar movement must be provided for linkage section H which is mounted on arm 15, to allow needle N to be lifted and lowered relative to record R and to accommodate any warpage in said record as the same is being played. Accordingly, hinge means 63 extends rearwardly from and is integral with offset portion 61. Hinge means 63 comprises hinge sections 64, 65 of V shaped section with their apices coincident and forming a horizontally disposed hinge line 66 which is coincident with pivot axis B—B.

Further hinge means is provided for interconnecting horizontal linkage section H with the vertical linkage section V to thereby translate the lateral movements of body portion 46 accruing from the modulation of needle N, to a vertical movement of linkage section V to thereby operate cone C.

To this end, hinge means 67 is provided in laterally offset relation to hinge section 65 of hinge means 63. Hinge means 67 comprises hinge sections 68, 69 of V shaped cross section with their apices coincident and forming a hinge line 70 which is on an axis parallel to and in laterally offset relation to axis A—A. Hinge section 68 extends laterally and integrally from hinge section 65 of hinge means 63. In turn, hinge section 69 is coupled to further hinge means 71 which comprises hinge sections 72, 73 of V shaped cross section. The apices of hinge sections 72, 73 are coincident, forming a vertically disposed hinge line 74 which is coincident with a vertical axis indicated at C—C.

It will be apparent that yoke member 35 and arm 15 can swivel about axis C, thus allowing linkage section H to have similar movements as needle N moves in the spiral groove of record R from the outer circumference thereof toward the center thereof, and then back to the rest position thereof.

Hinge section 72 and hinge section 69 are integral with a common member portion 75, said hinge sections projecting therefrom and being disposed at right angles to each other. Hinge section 73 is integrally connected along a vertical portion thereof to a vertically disposed portion 76 of vertical linkage section V. Portion 76 in turn is integrally connected with a laterally offset portion 77 of said linkage section V, the longitudinal axis of portion 77 being coincident with vertical axis C—C which passes through the apex of cone C.

Linkage portion 77 passes through the passage formed by opening 40 and bushing 38 of yoke member 35. Portion 77 is formed with a longitudinally extending tapered slot 78, the lower end of portion 77 being received in bushing 33 of cone C, and upon suitable adjustment relative to said bushing, a wedge 79 is inserted in tapered slot 78 to fix the position of linkage portion 77 relative to bushing 33.

Thus, it will be apparent, that as linkage section H is modulated from side to side by the action of needle N in the record groove, such movements will be translated to vertical movements of linkage section V, thereby actuating cone C to reproduce the audio signals transmitted from needle N by way of the one piece linkage, yet allowing all necessary movements of arm 15 incident to the playing of record R.

It is understood that linkage L may be molded of polypropylene resin, which combines the properties of good audio signal transmission and integral articulated hinge points, in a single molding operation. It is understood that other materials having the indicated properties may be used in lieu of polypropylene.

Further, cone C which is fixedly positioned, may be located as desired in a phonograph housing or other suitable mounting means, the linkage L having its successive hinge lines suitably located to effectively translate the modulation of needle N to the apex of the cone C. Further, cone C, being fixed in position and without encumbrance of needle N, may be of any selected size and configuration known in the art. Thus, horns of various configurations and disposition may be associated with cone C. Also, baffling may be provided in a manner known in the art, for use with cone C.

While the device 10 is shown as a phonograph per se, it is understood that the same may be incorporated in various toys such as talking dolls, and the like, where audio effects are desirable.

As the main body portion 46 of linkage portion H has its longitudinal axis coincident with the modulating axis A—A, the mass of said body portion 46 presents minimal resistance to the modulated movements of needle N. This, together with the high compliancy of all the articulated portions of linkage L, insures minimal wear of the record grooves.

The linkage L lends itself to providing a mechanical advantage or disadvantage in accordance with a desired volume output of cone C and compliancy of the system. Thus, with a fixed needle length, i.e. the distance between the point of needle N and the axis A—A of linkage body portion 46; the offset distance of axis C—C of linkage section V relative to axis A—A of linkage section H may be preset at desired values to achieve either a relatively high compliancy and a relatively low volume output with small offset values, or a relatively low compliancy and a relatively high volume output with larger offset values.

As various changes might be made in the embodiment of the herein disclosed invention without departing from the siprit thereof, it is understood that all matter herein shown or described shall be deemed illustrative and not by way of limitation.

I claim:

1. In a phonograph comprising: base means, sound reproducing cone means fixedly positioned on said base means, a movable tone arm on said base means, and needle means; audio signal transmitting linkage means mounted on said tone arm, said linkage means comprising a first section pivotally mounted for oscillation about its longitudinal axis, said section including an extension at one end laterally offset from the longitudinal axis of said section, said needle means being mounted on said first section opposite the said extension; and a second section hingedly connected to said extension, said cone means being fixedly connected to said second section; and a plurality of hinge means integral with and connecting said first section and said second section to each other, for converting oscillatory movement of said first section to reciprocating movement of said second section, whereby said cone means is directly responsive to movements of said needle means.

2. In a phonograph as in claim 1 wherein said linkage means comprises a plurality of stiff linkage sections and said hinge means comprises highly compliant, articulated portions interconnecting said linkage sections.

3. In a phonograph as in claim 1 wherein said first and second linkage portions are substantially at right angles to each other, said last mentioned hinge means having a hinging axis parallel to the axis of movement of said first linkage portion and in laterally offset relation thereto.

4. In a phonograph as in claim 3 wherein said linkage comprises a single element of molded polypropylene resin, said element comprising succeeding stiff sections, said hinge means comprising flexible portions interconnecting said stiff sections.

5. In a phonograph as in claim 1 wherein the offset distance between said linkage sections is substantially directly proportional to the volume output of said cone means and is substantially inversely proportional to the compliancy of said linkage means.

References Cited

UNITED STATES PATENTS

| | | | |
|---|---|---|---|
| 1,312,959 | 8/1919 | Davis et al. | |
| 1,473,005 | 11/1923 | Bishop. | |
| 3,282,588 | 11/1966 | Ashmele | 274—1 |

LEONARD FORMAN, *Primary Examiner.*

F. J. D'AMBROSIO, *Assistant Examiner.*

U.S. Cl. X.R.

274—23